United States Patent Office 3,267,191
Patented August 16, 1966

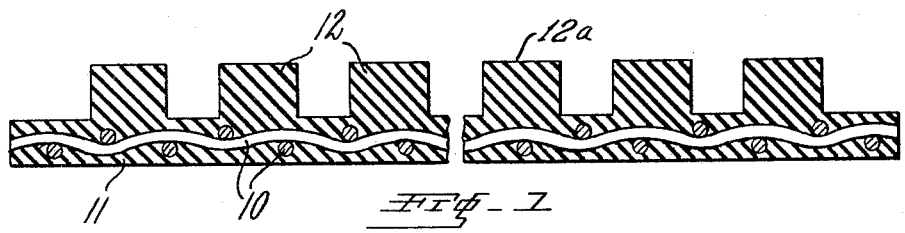
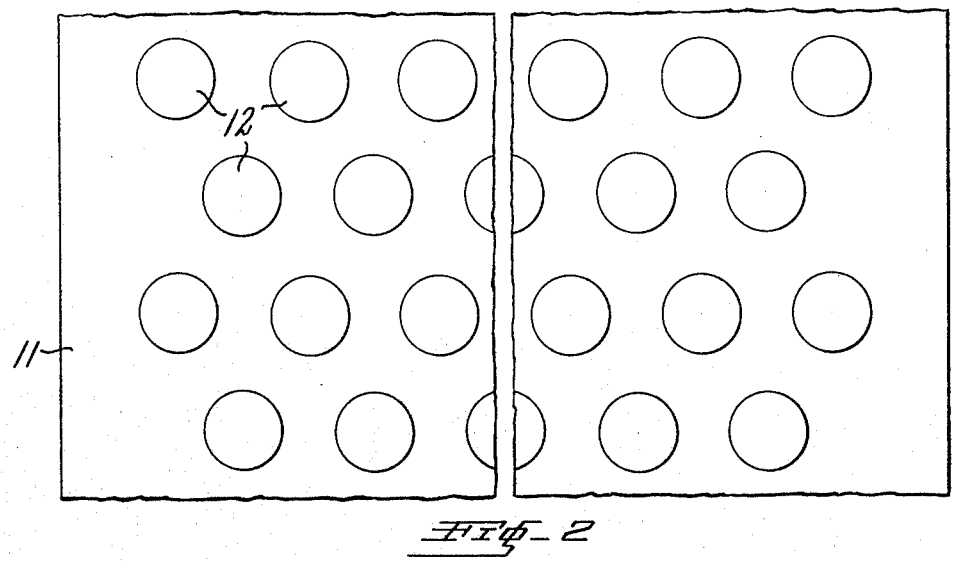
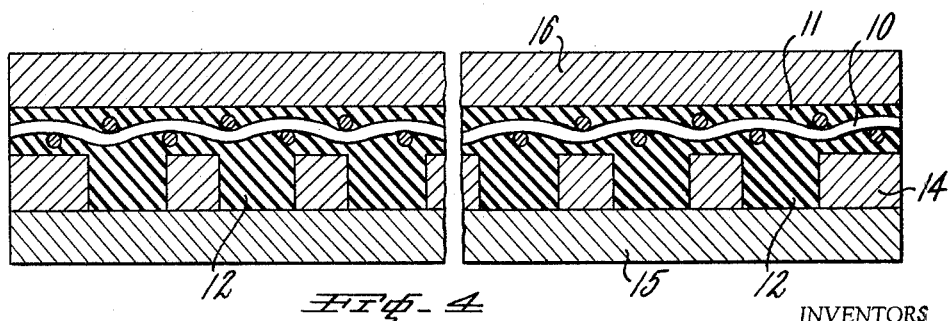
INVENTORS
GEORGE M. WILLIAMS
GERARDO P. PALLANTE
BY
*Irwin M. Lewis*
ATTORNEY

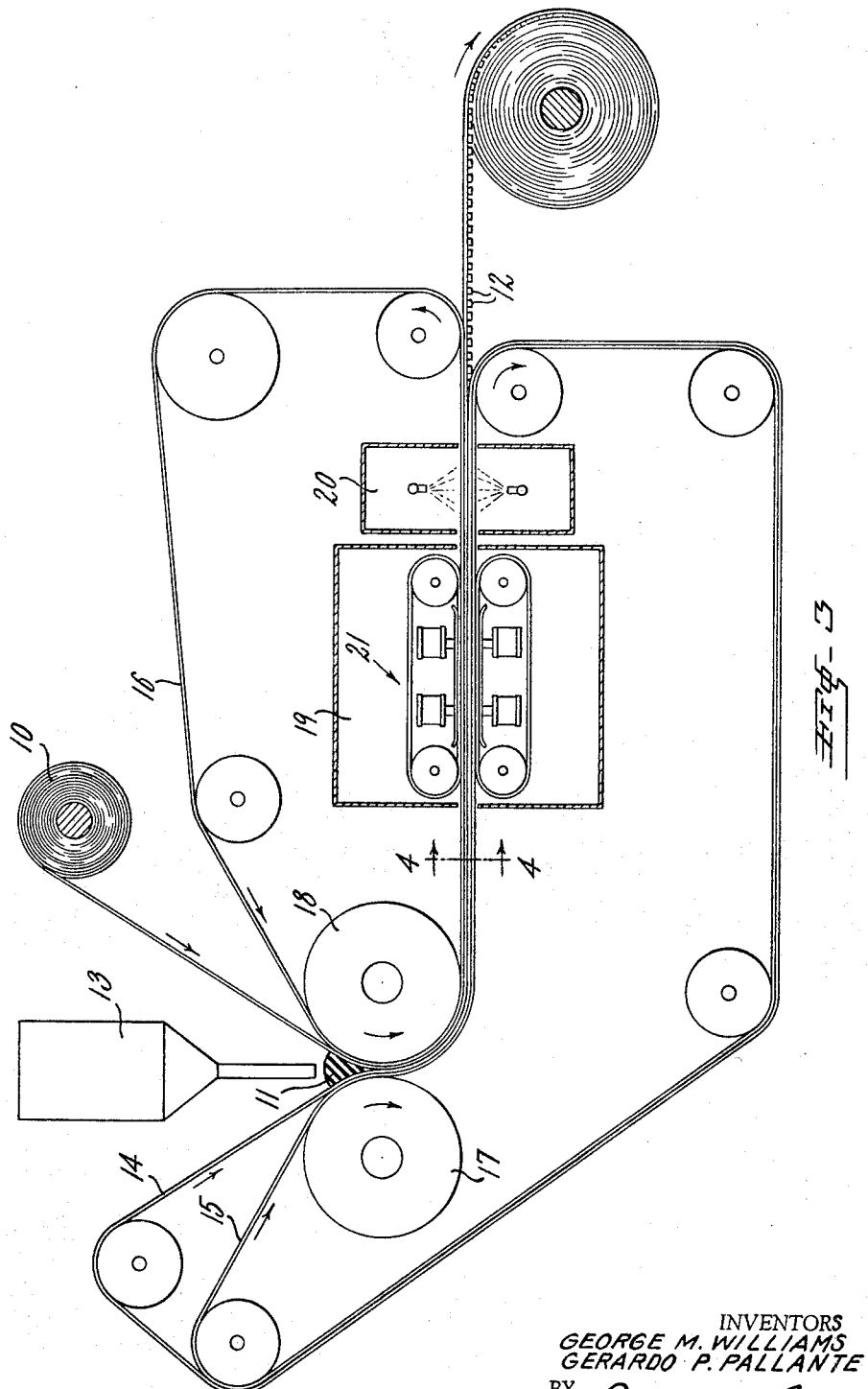

3,267,191
METHOD OF FORMING A RUBBER SHEET HAVING STUBS EXTENDING FROM ONE SURFACE
George M. Williams, Glen Rock, and Gerardo P. Pallante, Newark, N.J., assignors to United States Rubber Company, New York, N.Y., a corporation of New Jersey
Filed July 7, 1961, Ser. No. 126,769
2 Claims. (Cl. 264—166)

This application is a continuation-in-part of our prior co-pending application, Serial No. 743,575, filed June 23, 1958, and now abandoned.

The invention relates to a method for forming a drag-reducing covering for reducing the frictional drag of an object intended to be moved through a fluid medium.

More particularly the invention relates to a method for forming a covering which when applied to an object may be fluid filled to take advantage of the principle described in United States Patent No. 3,161,385 entitled, "Means and Method for Stabilizing Laminar Boundary Layer Flow."

The primary purpose of the invention is to provide a relatively simple, inexpensive, efficient method of making the covering.

In accordance with the invention the covering consists of a resilient rubber-impregnated fabric layer having a plurality of small rubber stubs extending from one surface thereof. The covering is applied by adhering the end surfaces of the stubs to the surface of the object so that a space, which may be fluid filled, exists between the impregnated fabric and the surface of the object. The present invention contemplates that the impregnated fabric be porous so that filling of the space between the fabric and the object with fluid occurs when the object is immersed in the fluid medium in which the object is to be moved. The invention also contemplates filling the space by a suitable means, such as by a hypodermic-type needle, which can be inserted through the impregnated fabric after the covering has been applied to the object.

The present invention contemplates a continuous process of forming the covering. In accordance with the invention an uncured, vulcanizable rubber is fed between the fabric intended to form a part of the covering and a perforated belt, and the fabric, rubber and belt are then passed through the nip of a pair of calender rolls, thereby to force the rubber into the interstices of the fabric and into the perforations of the belt to form the stubs. Prior to their being passed through the calender rolls, the perforated belt and the fabric are disposed between a pair of carrier belts. From the calender rolls the assembly of the fabric, rubber, perforated belt and carrier belts is passed through a curing oven where the rubber is cured. After the cure, the carrier belts and the perforated belt are stripped away leaving the covering consisting of the rubber-impregnated fabric with a multitude of resilient rubber stubs extending from one face thereof.

The present invention having been broadly described, a more detailed description is given hereafter by reference to the accompanying drawings wherein:

FIG. 1 is a sectional view of the covering of the invention,

FIG. 2 is a partial plan view of the covering shown in FIG. 1,

FIG. 3 is a schematic view of apparatus for making the covering, and

FIG. 4 is a sectional view taken on the line 4—4 of FIG. 3.

Referring to the drawings and in particular to FIGS. 1 and 2, the covering of the present invention includes a fabric layer 10 impregnated with resilient rubber 11 and having a plurality of small resilient precisely-formed rubber stubs 12 formed integrally with the impregnating rubber 11. The stubs 12 are quite small and closely spaced. Typical dimensions and spacing are 0.040" for the diameter of the stubs and a center spacing of 0.100".

In utilizing the covering to reduce frictional drag of an object as it is moved through a fluid medium, the top surfaces 12a of the stubs 12 are adhered to the surface of the object, thereby leaving space between the object and the covering which may be filled with a damping fluid to take advantage of the principle described in said Patent No. 3,161,385. It is obvious, therefore, that the top surfaces 12a must be perfectly flat and have sharply defined corners, as shown in FIG. 1.

Depending on the thickness of the covering of the impregnating rubber 11, the impregnated fabric 10 may be porous or non-porous. If it is porous, filling of the space between the object and the covering may occur during immersion of the object in the fluid in which it is to be moved. If the coated fabric is non-porous or the fabric omitted as described hereafter, the damping fluid may be injected into the space through a hypodermic-type needle inserted through the covering, after the covering has been adhered to the object.

Referring to FIG. 3, the covering of the invention is made by feeding the rubber 11 in an uncured, vulcanizable condition, preferably in liquid form, from a suitable metering device 13, such as a gear pump, in between a moving strip of the fabric 10 and a moving perforated belt 14. The fabric 10 and the perforated belt 14 are in turn disposed between carrier belts 15 and 16. The resulting assembly is then passed through the nip of calender rolls 17, 18 so that the rubber 11 is forced into the interstices of the fabric 10 to the desired extent and into the perforations of the perforated belt 14 to form the stubs 12 as shown in FIG. 4. From the rolls 17 and 18 the assembly passes through a suitable vulcanizing oven 19 where the rubber 11 is cured and then through a cooling chamber 20 where the assembly may be cooled by a stream of air or the like. Thereafter the carrier belts 15 and 16 and the perforated belt 14 are stripped away leaving the impregnated fabric 10 with the integral resilient rubber stubs 12 extending from one surface thereof.

Optionally, the sandwich consisting of the carrier belts 15 and 16, the perforated belt 14, the fabric 10 and the rubber 11 may be rolled, either after curing or after cooling, and stored before stripping of the carrier belts 15 and 16 and perforated belt 14.

A suitable release agent may be applied to carrier belt 16 to facilitate the stripping thereof from the impregnated fabric 10.

In addition, a material which is tacky at room temperature, but which loses its adhesiveness and facilitates parting when heated to the curing temperature of the rubber, must be applied between carrier belt 15 and perforated belt 14. The use of this material in the tacky state will cause belts 14 and 15 to stick together as the rubber 11 is forced into the perforations of the perforated belt 14, thereby to minimize flashing of the rubber between belts 14 and 15. This is important because, due to the small size and close spacing of the stubs, any appreciable flash would cause adherence of one stub to the next. Separating the finished article from belts 14 and 15 would then cause tearing of the tiny stubs 12 from the sheet.

During the cure cycle the material loses its adhesiveness or tackiness and permits belt 15 to be easily separated from belt 14 and also permits the stubs 12 to be easily released from belts 14 and 15 (see FIG. 4).

A silicone compound, such as Dow-Corning 20 Compound, which is a methylpolysiloxane of intermediate molecular weight, is a suitable material for this purpose. It is preferable to apply such a compound as a 50% solution in toluene. Such silicone compounds, dissolved as aforesaid, are usually used merely as parting agents by applying them to molds and drying them until completely free of diluent or by heating them to cure them into a release film. However, in our method, we use the compound initially as an adhesive, with the diluent still present, to stick belts 14 and 15 together. Only after the assembly goes through the curing stage is the compound converted into and used as a parting agent. The compound may be applied by spraying, wiping, doctoring or other conventional means.

The carrier belts 15 and 16 and the perforated belt 14 may be used over and over if properly cleaned between runs. In such an event the belts would be continuous and trained around suitable idler rollers as shown in FIG. 3. The carrier belts 15 and 16 are the perforated belt 14 may be cheaply made from a polyethylene terephthalate sheet or film. The perforations may be easily and cheaply provided by a punching operation. The thickness of the perforated belt 14 should be equal to the desired height of the stubs. Other materials having good dimensional stability and strength at curing temperatures, such as stainless steel, can be used.

Various rubbers, including natural, synthetic or blends thereof may be used for the impregnating rubber 11. However, self-solidifying liquid polyurethane rubbers are particularly useful as they do not have to be cured under pressure. One such liquid polyurethane rubber suitable for the purpose is made by mixing 0.86 part of ethanolamine with 100 parts of a prepolymer which is the reaction product of 2453 parts of a poly (ethylene/propylene adipate) of molecular weight 2800 (the ethylene/propylene mole ratio being 70/30) and 350 parts of toluene-2,4-diisocyanate.

If a rubber requiring curing under pressure is used, a conventional belt press of the general type as indicated at 21 in FIG. 3 can be used.

Various textile fabrics may be used for the fabric 10. A nylon fabric is particularly useful because of its strength and water resistance.

From the above description it can be seen that there is provided a relatively simple, inexpensive covering for use as a fluid-filled drag-reducing covering for objects intended to be moved through a fluid medium, and that there is also provided a simple efficient method of making the covering.

While the invention has been described in conjunction with a fabric reinforced covering and while such a covering forms a part of the invention, it will be appreciated that the method of the invention can be used to make an unreinforced covering when porosity and strength are not important. In using the method of the invention to form such a covering, the fabric is merely eliminated and the rubber 11 fed in between the perforated belt 14 and the carrier belt 16 and the method otherwise performed as previously described. The resulting product consists of a rubber sheet having the multitude of stubs extending from one face thereof.

It is to be understood that the above description and accompanying drawings are for the purpose of illustration and not by way of limitation, and that changes or modifications may be made therein without departing from the spirit and scope of the invention.

Having thus described our invention, what we claim and desire to protect by Letters Patent is:

1. A method of forming a rubber sheet having a plurality of small closely-spaced precisely-formed flat topped rubber stubs extending from one surface thereof, comprising disposing a perforated belt between two carrier belts, feeding an uncured vulcanizable rubber between one of said carrier belts and said perforated belt, interposing a material which is tacky at room temperature but which loses its adhesiveness and facilitates parting when heated to the curing temperature of said rubber between said perforated belt and the other of said carrier belts, passing the resulting assembly through the nips of a pair of calender rolls to provide pressure to force a portion of said rubber into the perforations of said perforated belt, the rest of said rubber being formed into a sheet, heating said rubber to cure the same, and stripping said carrier belts and said perforated belt from said rubber sheet.

2. The method of claim 1, in which said material is a methylpolysiloxane of intermediate molecular weight.

References Cited by the Examiner

UNITED STATES PATENTS

| | | | |
|---|---|---|---|
| 2,708,289 | 5/1955 | Collings | 18—57 |
| 2,811,408 | 10/1957 | Braley | 18—47 |
| 2,816,853 | 12/1957 | Meyers | 156—222 |
| 2,841,515 | 7/1958 | Runton | 154—52.1 |

ALEXANDER H. BRODMERKEL, *Primary Examiner.*

ALEXANDER WYMAN, *Examiner.*

H. L. GATEWOOD, A. L. LEAVITT,
*Assistant Examiners.*